United States Patent

[11] 3,624,210

[72] Inventors Richard P. Blye
Flemington;
George O. Allen, Jr., Somerville; Roger E. Homm, Neshanic, all of N.J.
[21] Appl. No. 568,146
[22] Filed July 27, 1966
[45] Patented Nov. 30, 1971
[73] Assignee Ortho Pharmaceutical Corporation

[54] ANTIFERTILITY AGENT
3 Claims, No Drawings
[52] U.S. Cl. .................................................. 424/317
[51] Int. Cl. .......................................................... A61k 27/00
[50] Field of Search ............................................. 167/74, 53, 65.3; 424/317

[56] References Cited
UNITED STATES PATENTS
2,582,253  1/1952  Hogg et al ...................... 167/65 X

*Primary Examiner*—Stanley J. Friedman
*Attorneys*—Alexander T. Kardos, Arnold S. Worfolk and Lewis Stein

ABSTRACT: 2-Methyl-3-ethyl-4-(p-methoxyphenul)-3-cyclohexenecarboxylic acid, and 2-methyl-3-ethyl-4-(p-methoxyphenyl)-4-cyclohexenecarboxylic acid when administered orally postcoitally act as antilittering and antizygotic agents.

ANTIFERTILITY AGENT

The present invention relates to the use of the compounds 2-methyl-3-ethyl-4-(p-methoxyphenyl)-3-cyclohexenecarboxylic acid, and 2-methyl-3-ethyl-4-(p-methoxyphenyl)-4-cyclohexenecarboxylic acid as agents for the oral control of female reproduction.

Hogg and Nathan, U.S. Pat. No. 2,582,253 discloses the synthetic estrogens 2-methyl-3-ethyl-4-(p-methoxyphenyl)-$\Delta^3$-and$\Delta^4$-cyclohexenecarboxylic acid. It has now been found that these compounds have pharmacological effect not only as estrogens, but also as antilittering and antizygotic agents when administered orally postcoitally.

The antilittering effect of a compound is determined by the following procedure:

An experimental group of animals, usually mice or rats, composed of 10 females and four males are segregated. The compound to be tested is mixed with a basic diet, Purina Laboratory Chow, and the segregated animals of both sexes are fed with the basic diet containing the compound to be tested for a period of 7 days. The animals are then cohabited at a ratio of two males to five females per cage and allowed to copulate freely for a period of 15 days during which time they are fed the basic diet containing the compound under test. The sexes are then segregated and fed only the basic diet. A control group of animals is tested identically, except that the basic diet does not contain the compound under test. The actual consumption of the test compound is calculated from records of food intake. Littering during the 21-day period following the period of cohabitation is observed.

Tables I and II show the results of the antilittering tests in rats of 2-methyl-3-ethyl-4-(p-methoxyphenyl)-3-cyclohexenecarboxylic acid, and 2-methyl-3ethyl-4-(p-methoxyphenyl)-4-cyclohexenecarboxylic acid respectively.

TABLE I

| | Dose/kg, body wt,/ day, mg, | Actual dose (mg,/kg,) based on diet consumption | Number of females | Number of litters |
|---|---|---|---|---|
| Test rats: | | | | |
| Group 1 | 0.001 | 0.00072 | 9 | 4 |
| Group 2 | 0.005 | 0.0036 | 10 | 1 |
| Group 3 | 0.010 | 0.0064 | 10 | 0 |
| Group 4 | 0.025 | 0.011 | 10 | 0 |
| Control | | | 10 | 9 |

TABLE II

| | Dose/kg, body wt,/ day, mg, | Actual dose (mg,/kg,) based on diet consumption | Number of females | Number of litters |
|---|---|---|---|---|
| Test rats: | | | | |
| Group 1 | 0.001 | 0.0003 | 10 | 5 |
| Group 2 | 0.0025 | 0.0007 | 9 | 0 |
| Group 3 | 0.005 | 0.002 | 10 | 0 |
| Group 4 | 0.010 | 0.003 | 10 | 0 |
| Control | | | 10 | 9 |

The data shown in tables I and II demonstrate that littering in rats is effectively prevented at dose levels of 0.0036 mg./kg. of body weight for 2-methyl-3-ethyl-4-(p-methoxyphenyl)-3-cyclohexenecarboxylic acid and 0.0007 mg./kg. of body weight for 2-methyl-3-ethyl-4-(p-methoxyphenyl)-4-cyclohexenecarboxylic acid.

In a group of 13 female mice fed a diet containing 20 methyl-3-ethyl-4-(p-methoxyphenyl)-3-cyclohexenecarboxylic acid at a dosage level of 0.050 mg./kg. of body wt./day, none of the mice produced litters.

It has also been determined that 2-methyl-3-ethyl-4-(p-methoxyphenyl)-3-and-4-cyclohexenecarboxylic acid have the specific effect of lysing the zygote. The zygote is the fertilized egg prior to nidation.

The antizygotic effect is established by tests in animals in which there is evidence of positive matings. Adult females of known fertility are mated with adult males of known fertility. Vaginal smears are made to determine the presence of sperm. On the day of sperm in the vagina and on the following day, the females are treated orally with the compound under test. On the 9th day after sperm presence in the vagina, the animals are autopsied and the status of the pregnancy is determined.

Table III shows the results of the antizygotic effect of 2-methyl-3-ethyl-4-(p-methoxyphenyl)-3-cyclohexenecarboxylic acid in rats.

Table IV shows the results of the antizygotic effect of 2-methyl-3-ethyl-4-(p-methoxyphenyl)-4-cyclohexenecarboxylic acid in rats.

TABLE III

| Rat No, | Dose/kg, body wt,/day | Vaginal smears | Pregnancy status |
|---|---|---|---|
| 1 | 25 µg | 5,551 | No implantation, |
| 2 | 25 µg | 5,551 | Do, |
| 3 | 25 µg | 5,551 | Do, |
| 4 | 25 µg | 5,551 | Do, |
| 5 | 25 µg | 5,551 | Do, |
| 6 | 10 µg | 5,551 | Do, |
| 7 | 10 µg | 5,551 | Do, |
| 8 | 10 µg | 5,551 | Do, |
| 9 | 10 µg | 5,551 | Do, |
| 10 | 10 µg | 5,551 | Do, |
| 11 | 5 µg | 5,551 | Do, |
| 12 | 5 µg | 5,551 | Do, |
| 13 | 5 µg | 5,551 | Do, |
| 14 | 5 µg | 5,551 | Do, |
| 15 | 5 µg | 5,121 | Do, |
| 16 | 1 µg | 5,551 | 9 embryos, |
| 17 | 1 µg | 5,151 | 6 embryos, |
| 18 | 1 µg | 5,151 | 14 embryos, |
| 19 | 1 µg | 5,551 | 10 embryos, |
| 20 | 1 µg | 5,511 | 11 embryos, |
| 21 | Control | 51 | 8 fetuses, |
| 22 | do | 51 | Do, |
| 23 | do | 51 | 1 fetus, |
| 24 | do | 51 | 8 fetuses, |
| 25 | do | 51 | Not pregnant, |

TABLE IV

| Rat No. | Dose/kg. body wt. /day | Vaginal Smears | Pregnancy Status |
|---|---|---|---|
| 1 | 10 µg. | 5551 | no implantation |
| 2 | 10µg. | 5551 | no implantation |
| 3 | 10 µg. | 555 | no implantation |
| 4 | 10 µg. | 555 | no implantation |
| 5 | 10 µg. | 555 | 1 small implantation |
| 6 | 5 µg. | 555 | no implantation |
| 7 | 5 µg. | 555 | no implantation |
| 8 | 5 µg. | 555 | 5 small implantations |
| 9 | 5 µg. | 555 | 4 small implantations / 1 resorption |
| 10 | 5 µg. | 555 | 1 small implantation / 5 resorptions |

In the column entitled "Vaginal Smears" in tables III and IV, the numerals 5, 1 and 2 designate respectively, estrus, metestrus and diestrus.

Table III demonstrates the antizygotic effect in rats of 2-methyl-3-ethyl-4-(p-methoxyphenyl)-3-cyclohexenecarboxylic acid at dose levels of 5 µg. per kg. body weight per day and table IV demonstrates the antizygotic effect in rats of 2-methyl-3-ethyl-4-(p-methoxyphenyl)-4-cyclohexenecarboxylic acid at dose levels of 10 µg. per kg. body weight per day.

The antizygotic effect of the compounds of the invention has also been demonstrated in the rabbit. The test for antizygotic effect is conducted in the manner mentioned hereinabove, except that the rabbits are treated for 4 days following mating rather than 2 days as in the rat, and due to the longer gestation period of the rabbit, autopsy is performed on the 13th day to the 26th day after mating.

Table V shows the results of the antizygotic test in rabbits of 2-methyl-3-ethyl-4-(p-methoxyphenyl)-3-cyclohexenecarboxylic acid.

TABLE V

| Rabbit No. | Dose/kg. body wt./ day, μg. | Days dosed | Day autopsied | Pregnancy status |
| --- | --- | --- | --- | --- |
| 1 | 100 | 0-3 | 21 | No implantation. |
| 2 | 100 | 0-3 | 18 | Do. |
| 3 | 100 | 0-3 | 18 | Do. |
| 4 | 100 | 0-3 | 18 | Do. |
| 5 | 100 | 0-3 | 15 | Do. |
| 6 | 100 | 0-3 | 26 | Do. |
| 7 | 100 | 0-3 | 26 | Do. |
| 8 | 100 | 0-3 | 22 | Do. |
| 9 | 100 | 0-3 | 20 | Do. |
| 10 | 100 | 0-3 | 18 | Do. |
| 11 | 50 | 0-3 | 15 | Do. |
| 12 | 50 | 0-3 | 15 | 3 implantations. 1 resorption. |
| 13 | 50 | 0-3 | 15 | 6 implantations. |
| 14 | 50 | 0-3 | 13 | 2 implantations. 1 resorption. |
| 15 | 50 | 0-3 | Died | |
| 16 | 50 | 0-3 | 22 | No implantation. |
| 17 | 50 | 0-3 | 20 | 1 resorption. |
| 18 | 50 | 0-3 | 19 | 3 implantations. 1 resorption. |
| 19 | 50 | 0-3 | 19 | No implantation. |
| 20 | 50 | 0-3 | 16 | Do. |

Table V demonstrates the antizygotic effect in rabbits of the compound of the invention at a dose level of 100 μg. per kg. body weight per day.

The effect of the compounds of the invention is to destroy the zygote in the Fallopian tube. Since the zygote is present for varying periods of time depending upon the species, the dosage regimen of the antizygotic compounds of the invention is varied to suit the particular schedule of zygote presence in the Fallopian tube for the species being treated.

The compounds of the invention may be orally administered in any convenient form.

What is claimed is:

1. A method of controlling pregnancy which comprises the oral administration to female animals for from 2 to 5 days postcoitally of from 5 μg. to 100 μg. per kilogram of body weight per day of a compound selected from the group consisting of 2-methyl-3-ethyl-4-(p-methoxyphenyl)-3-cyclohexenecarboxylic acid, and 2-methyl-3-ethyl-4-(p-methoxyphenyl)-4-cyclohexenecarboxylic acid, whereby pregnancy is prevented.

2. A method according to claim 1, wherein female animals are treated orally with 2-methyl-3-ethyl-4-(p-methoxyphenyl)-3-cyclohexenecarboxylic acid for from 2 to 5 days postcoitally.

3. A method according to claim 1, wherein female animals are treated orally with 2-methyl-3-ethyl-4-(p-methoxyphenyl)-4-cyclohexenecarboxylic acid for from 2 to 5 days postcoitally.

* * * * *